United States Patent [19]

Meickl

[11] Patent Number: 4,558,968
[45] Date of Patent: Dec. 17, 1985

[54] BEAM CONNECTOR

[75] Inventor: Gerhard Meickl, Ockenfels, Fed. Rep. of Germany

[73] Assignee: Streif AG, Rhein, Fed. Rep. of Germany

[21] Appl. No.: 326,418

[22] Filed: Dec. 1, 1981

[30] Foreign Application Priority Data

Dec. 12, 1980 [DE] Fed. Rep. of Germany ....... 3046790

[51] Int. Cl.⁴ ............................................... F16B 9/00
[52] U.S. Cl. .................................... 403/174; 403/255; 403/364; 144/354; 144/355; 5/288; 5/296; 5/304
[58] Field of Search ............... 403/364, 298, 292, 246, 403/245, 255, 254, 174, 178, 266, 267, 293, 286, 364, 339, 345; 156/250, 258, 304.5; 144/345, 354, 355, 369; 5/288, 295, 296, 301, 304, 200 C, 201, 208 R, 292, 293, 294, 290

[56] References Cited

U.S. PATENT DOCUMENTS

| 674,752 | 5/1901 | Baker | 403/364 X |
| 1,099,771 | 6/1914 | Slater | 5/200 C |
| 3,355,196 | 11/1967 | Harrison | 403/364 X |
| 3,480,054 | 11/1969 | Marian | 404/364 X |
| 3,972,638 | 8/1976 | Vivoli | 403/298 X |
| 4,299,509 | 11/1981 | Meickl | 403/174 X |

FOREIGN PATENT DOCUMENTS 166686 3/1934 Switzerland ........................ 403/339

Primary Examiner—Richard J. Scanlan, Jr.
Attorney, Agent, or Firm—Oblon, Fisher, Spivak, McClelland & Maier

[57] ABSTRACT

A connector of structural parts such as beams with a through-going wooden pillar is disclosed. The connection consists of a first plate having a hook and being fastened to the beam in a torsion free manner. This hook has an essentially horizontal supporting area at the lower end and at least one vertical contact area. A second cross-shaped support plate is disposed in a pillar and its vertical plate portions are in one plane with the first plate. The second plate includes fitting areas which mate with the supporting area and the vertical contact area of the hook. The pillar is connected by means of a wedge-shaped tenon joint below the supporting area of the support plate.

1 Claim, 3 Drawing Figures

BEAM CONNECTOR

BACKGROUND OF THE INVENTION

1. Field of the Invention

The present invention relates to the connection of beams with a wooden pillar by means of perpendicularly placed plates.

2. Description of the Prior Art:

In a known connection of the indicated kind, see DE-OS No. 28 38 053, the plates developed for prefabricated skeleton construction, i.e. the support plates for the pillars and the hooked plates arranged at end surfaces of beams, can be relatively easily installed in beams and one-story pillars. In the mentioned Offenlegungsschrift there is also shown the installing of bipartite support plates of special design into pillars by making slots which, for instance, cross each other orthogonally. These plates which can be fitted into one another have the disadvantage that the load is transferred only by the plate with which the hook of the beam engages.

In the case of rigid, one-piece cross-plates which are connected with each other by welding or which are extruded, however, the fastenings of the respective transverse plate also participate in the load transmission. Particularly in the case of one-sided, but also in the case of two-sided load introduction into a cross-shaped, one-piece support plate considerably greater support forces can be transmitted than in the case of two plane, slotted plates which are shifted into each other by means of the slots to form a cross.

Therefore the invention is based on the problem of efficiently installing one-piece, cross-shaped support plates into a pillar in such a way that in the case of one-sided or two-sided, load introduction the fastenings of the respective transverse plate participate in the receiving of this load and that the pillar is subject to the smallest possible weakening of the cross section at the connecting point of the beams.

SUMMARY OF THE INVENTION

The above task is accomplished by the fact that the pillar with glued wedge-shaped tenon joint is connected in the region of the one-piece support plate below the supporting areas of the support plate. According to the invention glueing of the pillar parts is performed at the wedge-shaped tenon joint, so that the support plate takes over the function of a centering device for both pillar parts so that an accurately fitting joint is obtained automatically.

It is a known technique to join wood cross-sections by glueing wedge-shaped tenon joints to form a cross-section which is resistant to bending. Still, it is not at all obvious to the man skilled in the art to place the wedge-shaped tenon joint there where it is penetrated by the support plate at least in one direction. Rather, one would expect that the wedge-shaped tenon joint is placed at the upper end of the slot, because then the slot would have to be milled only into the end surface of the lower pillar part.

A suitable method for manufacturing a connection consists in firstly tenoning the abutting ends, then jointly planing the pillar parts which are only put together without glueing, then cutting the necessary slots into the respective pillar parts to be joined and drilling the bores for the fastenings of the support plate, then inserting the support plate into slots of the pillar part lying below the joining connection, then applying glue to the surfaces to be glued, then pressing the surfaces provided with glue against each other and driving the fastenings in while surfaces are pressed against each other, and then removing the pressure after the fastenings have been driven in, so that the hardening can take place under the holding influence of the fastenings, because then the cross-plate in connection with its fastenings functions as a fishplate and pegging element of the glued wedge-shaped tenon joint.

DETAILED DESCRIPTION OF THE PREFERRED EMBODIMENTS

Figure 1:
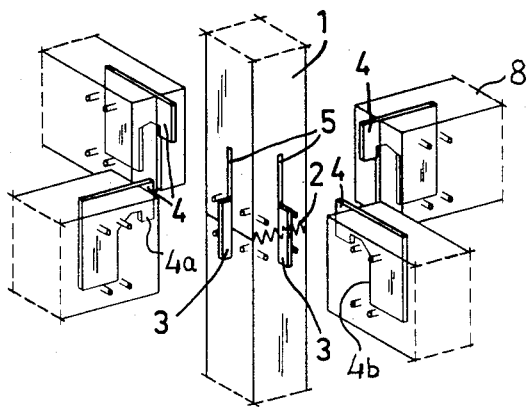
FIG. 1 shows a skeleton node with a pillar and 4 beams arranged orthogonally in isometric representation.

As seen in FIG. 1, the pillar 1 has the wedge-shaped tenon joint 2 at the level of the inserted cross-shaped support plate 3 and the beam heads provided for the connection to plate 3 via their hooked plates 4. In the present example all beams are on the same level and have the same measurements. Hooked plates 4 longitudinally fixed in beam 8 engage with slots 5 and settle on support plate 3 with corresponding horizontal areas 3a and 4a, and corresponding vertical contact areas 3b and 4b, of the plates 3 and 4 engaging one another. With the beam heads joined to the pillar 1, the wedge-shaped tenon joint 2 is no longer visible. Slot 5 in pillar 1 is freely accessible above the top edge of the beams, i.e. extends beyond it. If necessary, fitting pieces can be inserted into slot 5 resulting in a locking of the beams with pillar 1. This could be used for preventing an unintentional disengaging of the beams.

Figure 2:
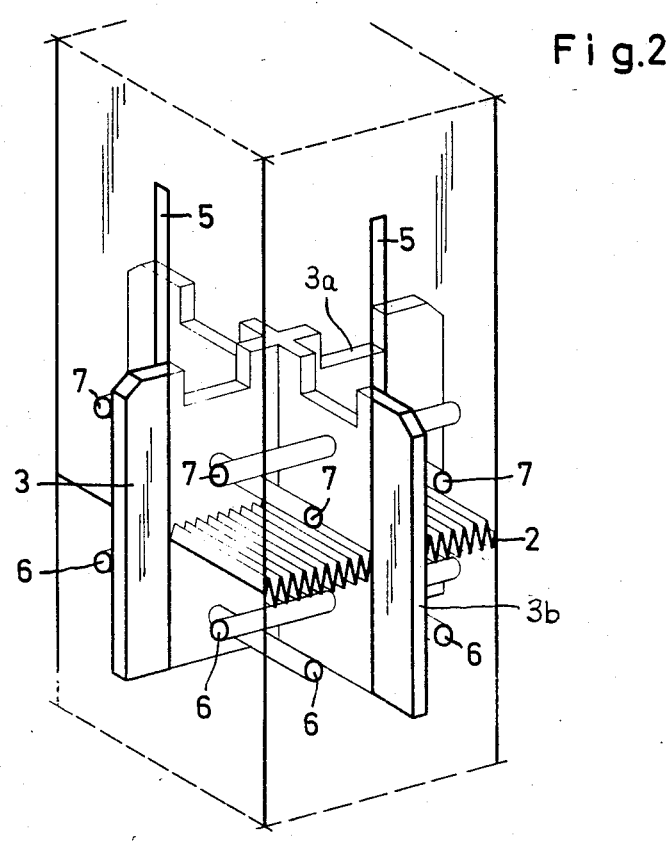
FIG. 2 shows the position of the wedge-shaped tenon joint having comb-shaped tenons in relation to the support plate in isometric representation.
Figure 3A:
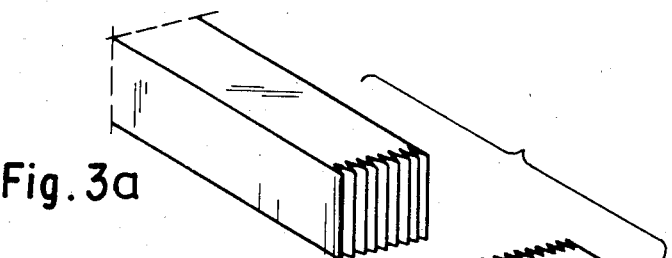
FIG. 3a–3e show schematically the steps of installing cross-shaped support plates into through-going pillars in isometric representation.
Figure 3B:
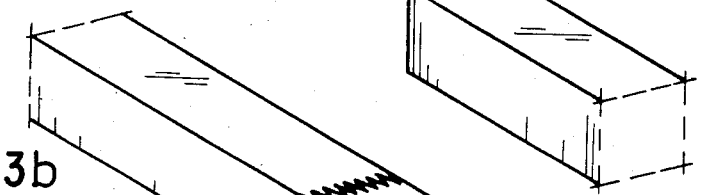
Figure 3C:
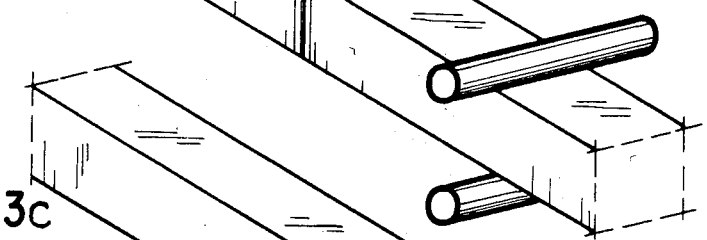
Figure 3D:
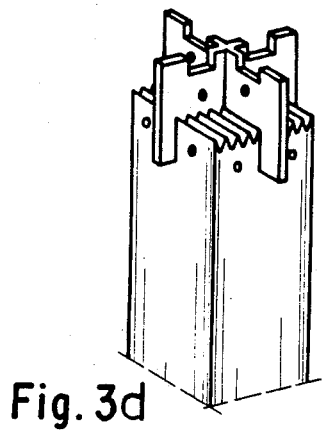
Figure 3E:
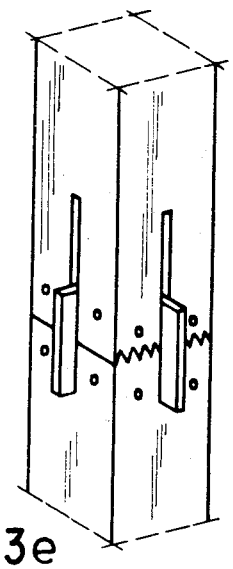

In FIG. 2 the wedge-shaped tenon joint 2 is shown in isometric representation as it is penetrated by the cross-shaped support plate 3. The representation makes clear that cross-shaped support plate 3 causes a centering of the pillar parts and has the effect of an additional pegging of the supporting areas. The shown pegs 6 join the support plate 3 with the lower pillar part, pegs 7 with the upper pillar part. Due to the fact that the wedge-shaped tenon joint 2 is located between fastenings or pegs 6 and 7, support plate 3 also has the effect of a connecting means of the two pillar parts. Tractions acting on the pillar joint are transmitted by the glued wedge-shaped tenon joint and also by the support plate 3 doweled in.

FIG. 3a–3e serve the explanation of the method according to the invention of installing one-piece support plates into through-going pillars.

FIG. 3 shows the five steps of installing cross-shaped support plates into the pillars.

At step a, a row of wedge-shaped tenons is cut into the end surfaces of the pillar parts.

At step b, the pillar joined without glueing at the wedge-shaped tenon joint is worked. All surfaces are, for instance, planed jointly.

At step c, the prepared end surface with wedge-shaped tenons receives bores for the pegs and the slots.

At step d, the cross-shaped support plate is installed into the lower pillar part and doweled by means of the pegs, with the wedge-shaped tenon surfaces having been already coated with glue.

At step e, the top pillar part is pressed on, the other pegs are also driven in, securing the glued pillar joining connection and rendering superfluous amp lengthy application of pressure.

The method of installing support plates into pillars was explained by the example of a square pillar. This type of installation proves to be very efficient in industrial production insofar as a surplus of glue applied on the wedge-shaped tenons cannot have any disadvantageous results. If the wedge-shaped tenon joint would be located above the support plates, then the surplus glue emerging from the wedge-shaped tenon joint and penetrating into slots 5 would harden and represent a hindrance when inserting the hooked plate, or even displace the supporting areas for the hooked plate so that the necessary accuracy of the assembling would no longer be ensured. When using the method according to the invention for the installation, the surplus glue cannot cause such a blocking of the slots.

Besides that, a pillar made according to the method of the invention having a cross-shaped, one-piece support plate does not weaken in the joint itself, because the inserted hooked plate represents a fishing of the joint. The pillar itself is weakened only by the relatively narrow slot 5 above the joint.

What is claimed as new and desirable to be secured by letters patents of the United States is:

1. A connection of a plurality of horizontal beams with a vertical wooden pillar, said connection comprising:
    a glued tenon joint at a first position along a longitudinal direction of said pillar and having upper and lower longitudinal sides;
    crossed slots in said pillar and extending along said first direction, said slots extending on both said upper and lower longitudinal sides of said tenon joint;
    a cross shaped rigid one piece support plate fitted in said slots and extending on both said upper and lower longitudinal sides of said tenon joint, said support plate having planar arms, means securing said support plate to said pillar on both said upper and lower longitudinal sides of said tenon joint; and
    a hooked plate fixed to each said beam in a torsion-proof manner, each said hooked plate extending from an end of each said beam in a plane parallel to a longitudinal direction of said beam and having a hook including a lower edge,
    said arms of said support plate and said hooks of said hooked plate have horizontal supporting areas and at least one vertical contact area which are mutually engagable when said hooked plates are inserted in said slots above said support plate, and said horizontal supporting area of said support plate is on said upper longitudinal side of said tenon joint.

* * * * *